(12) United States Patent
Morell

(10) Patent No.: US 6,557,424 B1
(45) Date of Patent: May 6, 2003

(54) METHOD AND APPARATUS FOR SENSING SEAT OCCUPANT WEIGHT

(75) Inventor: Scott M. Morell, White Lake, MI (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/503,826

(22) Filed: Feb. 15, 2000

Related U.S. Application Data

(60) Provisional application No. 60/120,653, filed on Feb. 24, 1999.

(51) Int. Cl.[7] .................. G01G 19/44; G01G 19/12; B60R 21/32
(52) U.S. Cl. ............. 73/862.045; 73/1.13; 73/862.543; 280/735; 280/730.1; 702/101
(58) Field of Search ............ 73/862.045, 862.543, 73/862.541, 1.13; 702/101; 701/36; 280/735, 734, 730.1

(56) References Cited

U.S. PATENT DOCUMENTS

| | | | |
|---|---|---|---|
| 2,708,005 A | 5/1955 | Gazzo | |
| 3,022,976 A | 2/1962 | Zia | 297/216.18 X |
| 3,766,344 A | 10/1973 | Nevett | 200/85 A |
| 4,075,443 A | 2/1978 | Fatur | 200/85 A |
| 5,232,243 A | 8/1993 | Blackburn et al. | 280/732 |
| 5,413,378 A | 5/1995 | Steffens | 280/735 |
| 5,474,327 A | 12/1995 | Schousek | 280/735 |
| 5,481,078 A | 1/1996 | Asche | 200/85 A |
| 5,502,284 A | 3/1996 | Meiller et al. | 200/85 A |
| 5,542,493 A | 8/1996 | Jacobson et al. | 180/272 |
| 5,570,903 A | 11/1996 | Meister et al. | 280/735 |
| 5,573,269 A | 11/1996 | Gentry et al. | 280/735 |
| 5,605,348 A | 2/1997 | Blackburn et al. | 280/735 |
| 5,612,876 A | 3/1997 | Zeidler et al. | 280/735 X |
| 5,618,056 A | 4/1997 | Schoos et al. | 280/735 |
| 5,624,132 A | 4/1997 | Blackburn | 280/735 |
| 5,626,359 A | 5/1997 | Steffens | 280/735 |
| 5,646,375 A | 7/1997 | Neuman | 177/54 |
| 5,670,853 A | 9/1997 | Bauer | 318/286 |
| 5,678,854 A | 10/1997 | Meister et al. | 280/735 |
| 5,732,375 A | 3/1998 | Cashler | 701/45 |
| 5,739,757 A | 4/1998 | Gioutsos | 340/667 |
| 5,804,887 A | 9/1998 | Holzapfel et al. | 307/10.1 |
| 5,810,392 A | 9/1998 | Gagnon | 280/735 |

(List continued on next page.)

FOREIGN PATENT DOCUMENTS

| | | | | |
|---|---|---|---|---|
| EP | 0 945 316 A2 | | 9/1999 | ........... B60R/21/32 |
| GB | 839121 | | 6/1960 | |
| JP | 7-186804 | * | 7/1995 | ............ B60N/2/44 |
| WO | 9822920 | | 5/1998 | ........... G08B/21/00 |
| WO | WO98/30413 | * | 7/1998 | ........... B60R/21/32 |

Primary Examiner—Thomas P. Noland

(57) ABSTRACT

A system for measuring the weight of a seat occupant is used to control airbag deployment. The system includes a seat bottom that receives a vertical seat occupant weight force. The seat is divided into four quadrants, a front right quadrant, a left front quadrant, a left rear quadrant, and a right rear quadrant. Each quadrant includes a sensor that generates a weight signal corresponding in magnitude to the seat occupant weight in the respective quadrant. Each weight signal is comprised of a vertical force component and an error component induced by braking or deceleration forces acting on the seat bottom in a non-vertical direction. The sensors are orientated within their respective quadrants such that two sensors generate a positive error reading and two sensors generate a negative error reading. When the weight signals from each quadrant are added together to determine the total seat occupant weight, the error is eliminated as the positive and negative error components cancel each other out. The seat occupant weight is determined by adding the vertical force components from each of the weight signals together.

20 Claims, 6 Drawing Sheets

U.S. PATENT DOCUMENTS

| | | | |
|---|---|---|---|
| 5,821,633 A | 10/1998 | Burke | 307/121.1 |
| 5,865,463 A | 2/1999 | Gagnon et al. | 280/735 |
| 5,878,620 A * | 3/1999 | Gilbert et al. | 73/865.9 |
| 5,905,210 A * | 5/1999 | O'Boyle et al. | 73/862.331 |
| 5,986,221 A * | 11/1999 | Stanley | 280/735 X |
| 5,991,676 A * | 11/1999 | Podoloff et al. | 73/862.046 X |
| 6,039,344 A | 3/2000 | Mehney et al. | 280/735 |
| 6,056,079 A * | 5/2000 | Cech et al. | 280/735 X |
| 6,089,106 A * | 7/2000 | Patel et al. | 73/862.582 |
| 6,092,838 A * | 7/2000 | Walker | 73/80.474 X |
| 6,242,701 B1 * | 6/2001 | Breed et al. | 280/735 X |
| 6,356,200 B1 * | 3/2002 | Hamada et al. | 280/735 |
| 6,364,352 B1 * | 4/2002 | Norton | 280/735 |
| 6,497,430 B1 * | 12/2002 | Odom et al. | 280/735 |
| 2002/0020994 A1 * | 2/2002 | Curtis | 280/735 |
| 2002/0043789 A1 * | 4/2002 | Lichtinger et al. | 280/735 |

* cited by examiner

METHOD AND APPARATUS FOR SENSING SEAT OCCUPANT WEIGHT

RELATED APPLICATION

This application claims priority to provisional application No. 60/120,653 filed on Feb. 24, 1999.

BACKGROUND OF THE INVENTION

1. Field of the Invention

This invention relates to a method and apparatus for measuring the weight of a seat occupant. Specifically, a simplified sensor arrangement is mounted within a vehicle seat to measure only vertical forces while canceling out lateral and longitudinal forces to provide an accurate weight measurement.

2. Related Art

Most vehicles include airbags for the driver and passenger. It is important to control the deployment force of the airbags based on the size of the driver or the passenger. One way to control the deployment force is to monitor the weight of the seat occupant. If a smaller person such as a child or infant in a car seat is in the passenger seat, the weight on the seat will be less than if an adult occupies the seat.

Current systems for measuring the weight of a seat occupant are complex and expensive. Sensors are placed at a plurality of locations in the seat bottom and the combined output from the sensors is used to determine the weight of the seat occupant. Each sensor experiences a substantially vertical force, due to the weight of the seat occupant, but is also subject to longitudinal and lateral forces caused by acceleration, deceleration, or turning. The lateral and longitudinal forces picked up by the sensor incorporate an error component into the weight measurement. Current seat weight sensors are very sophisticated using multiple strain gages and complicated bending elements to provide high measurement sensitivity in the vertical direction and low sensitivity to lateral and longitudinal forces.

One weight measurement system corrects for this error by providing a double bending beam in each sensor. Thus, each sensor is made up from two (2) separate half-bridge strain gages that are diametrically opposed to cancel forces in a longitudinal or lateral direction. The two half-bridge strain gages are connected to form a full Wheatstone bridge. By doing this, the differential of the signal generated by each half-bridge strain gage is the output.

An error force in the direction of the strain gage grids appears on each half-breed strain gage equally, and the differential is zero (0). Forces occurring in other directions are generally not significant to the generation of the signal due to being perpendicular to the strain gage grid. Thus, a characteristic of the double bending beam sensor is to cancel the forces along the axis parallel to the gage grids. The forces along the perpendicular axis are not problematic because these forces are perpendicular to the gage grid. This allows error to be eliminated or canceled out at each sensor location in the seat. The output from the combined sensors is then added together to determine the weight of the seat occupant. The use of a double bending beam for each sensor location is very expensive.

Thus, it is desirable to have an improved seat occupant weight measurement system that is simplified and inexpensive yet provides accurate measurements by eliminating error caused by lateral and longitudinal forces.

SUMMARY OF THE INVENTION

In a disclosed embodiment of this invention, a system for measuring the weight of a seat occupant includes a seat bottom for receiving a substantially vertical seat occupant weight force and at least one pair of sensors. A first sensor is mounted within a first portion of the seat bottom and a second sensor is mounted within a second portion of the seat bottom. The first sensor generates a first weight signal comprised of a first vertical force component and a positive error component induced by application of non-vertical seat forces to the seat bottom. The second sensor generates a second weight signal comprised of a second vertical force component and a negative error component induced by application the non-vertical seat forces. A processor is used to determine seat occupant weight based on the first and second weight signals. Seat occupant weight is determined by summation of the first and second vertical force components and adding the positive and negative error components eliminates error induced by the non-vertical seat forces.

In a preferred embodiment, the seat bottom is divided into a first quadrant, a second quadrant, a third quadrant, and a fourth quadrant. The first sensor is mounted within the first quadrant for generating the first weight signal comprised of the first vertical force component and a first error component induced by application of non-vertical seat forces to the seat bottom and the second sensor is mounted within the second quadrant for generating the second weight signal comprised of the second vertical force component and a second error component induced by application of non-vertical seat forces. A third sensor is mounted within the third quadrant for generating a third weight signal comprised of a third vertical force component and a third error component induced by application the non-vertical seat forces. A fourth sensor is mounted within the fourth quadrant for generating a fourth weight signal comprised of a fourth vertical force component and a fourth error component induced by application the non-vertical seat forces. The first and third sensors are preferably orientated within the first and third quadrants, respectively, such that the first and third error components are generated as positive errors. The second and fourth sensors are orientated within the second and fourth quadrants, respectively, such that the second and fourth error components are generated as negative errors. The processor determines seat occupant weight based on the first, second, third, and fourth weight signals and adding the positive and negative errors eliminates the error induced by the non-vertical seat forces.

A method for determining the weight of a seat occupant includes the following steps. A vertical occupant force is applied against a seat bottom. A first weight signal is generated that has a first vertical force component and a positive error component induced by application of a non-vertical force to the seat bottom. A second weight signal is generated that has a second vertical force component and a negative error component induced by the non-vertical force. The first and second weight signals are combined and the error induced by the non-vertical force is canceled by adding the positive and negative error components together. The first and second vertical force components are added together to determine seat occupant weight.

These and other features of the present invention can be best understood from the following specification and drawings, the following of which is a brief description.

DETAILED DESCRIPTION OF AN EXEMPLARY EMBODIMENT

Figure 1:
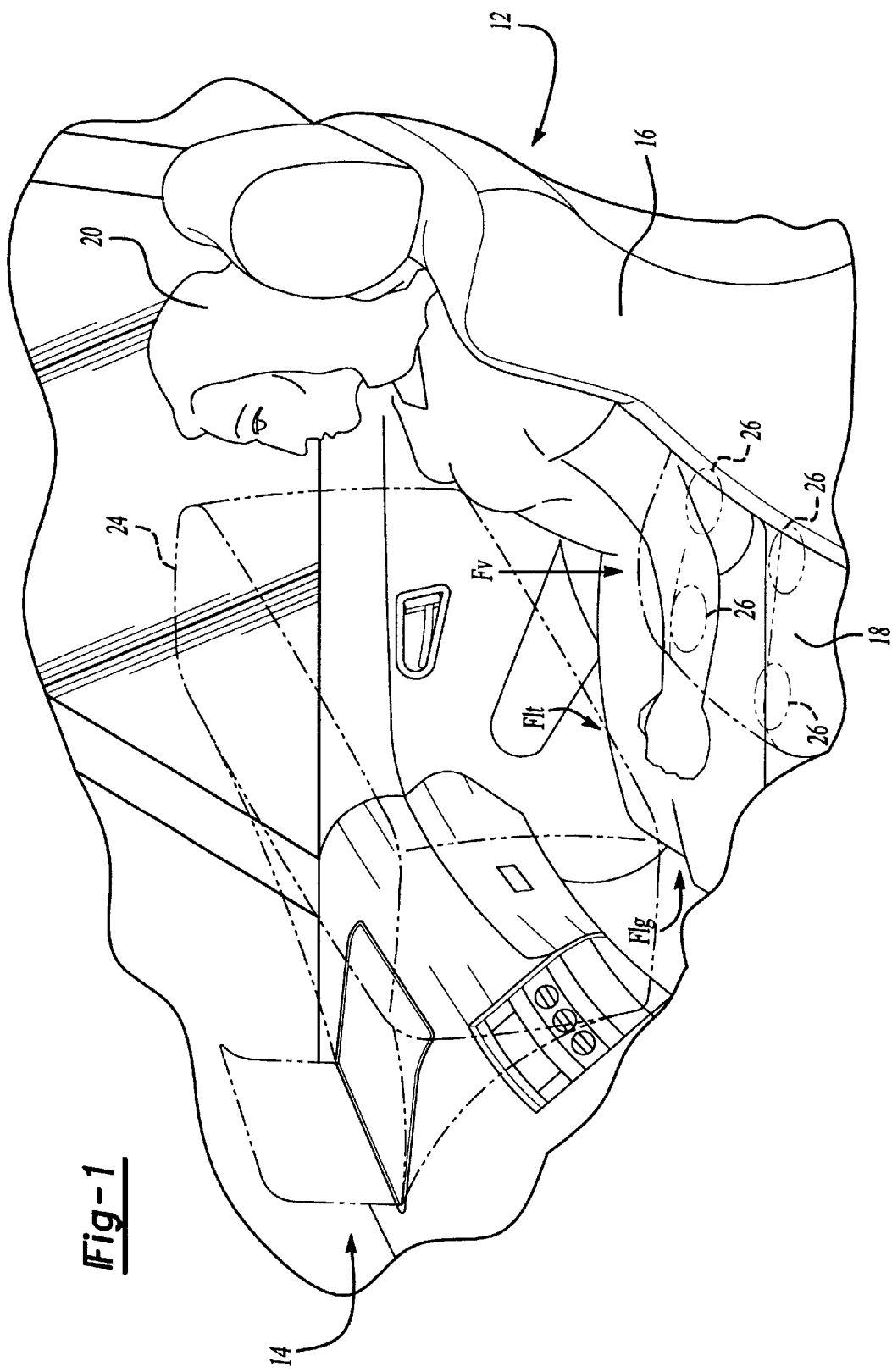
FIG. 1 is a perspective view showing a vehicle with an airbag system and an occupant sitting in a seat with the airbag in an active state.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a vertical force Fv is exerted against the seat bottom 18. The vertical force Fv represents the weight of the seat occupant 20.

The airbag system 14 deploys an airbag 24 under certain collision conditions. The deployment force for the airbag 24, shown in dashed lines in FIG. 1, varies according to the weight of the occupant 20. The vehicle includes a unique system for measuring the weight of the seat occupant 20.

The system preferably includes two (2) pairs of sensors 26, i.e., four (4) sensors total 26, which are mounted within the seat bottom 18. It should be understood that while two pairs of sensors, i.e., four (4) sensors, are preferred, a single pair or more than two (2) pairs of sensors could also be used.

Figure 2A:
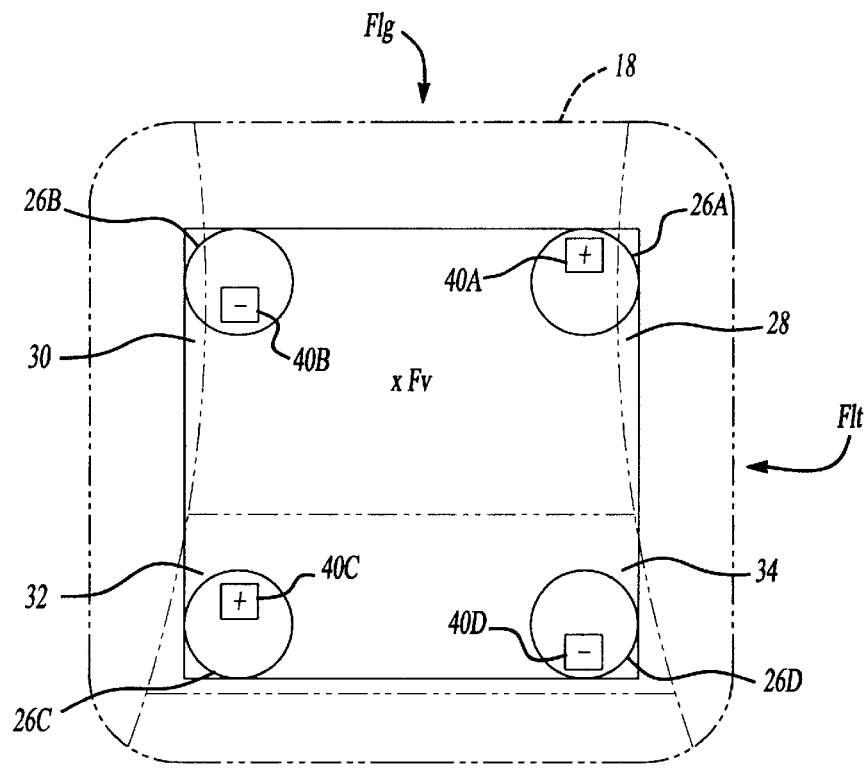
FIG. 2A is a view of one embodiment of a seat bottom incorporating the subject weight measurement system.

In the preferred embodiment shown in FIG. 2A, a first sensor 26a is mounted within a first portion 28 of the seat bottom 18, a second sensor 26b is mounted within a second portion 30 of the seat bottom 18, a third sensor 26c is mounted within a third portion 32 of the seat bottom 18, and a fourth sensor 26d is mounted within a fourth portion 34 of the seat bottom 18. Preferably, the seat bottom is divided into four (4) quadrants with the first portion 28 of the seat bottom 18 being the right front quadrant, the second portion 30 being the left front quadrant, the third portion 32 being the left rear quadrant, and the fourth portion 34 being the right rear quadrant. The first sensor 26a is mounted within the right front quadrant, the second sensor 26b is mounted within the left front quadrant, the third sensor 26c is mounted within the left rear quadrant, and the fourth sensor 26d is mounted within the right rear quadrant. A first weight signal S1 generated by the first sensor 26a corresponds in magnitude to a portion of seat occupant weight on the right front quadrant, the second weight signal S2 generated by the second sensor 26b corresponds in magnitude to a portion of seat occupant weight on the left front quadrant, the third weight signal S3 generated by the third sensor 26c corresponds in magnitude to a portion of seat occupant weight on the left rear quadrant, and the fourth weight signal S4 generated by the fourth sensor 26d corresponds in magnitude to a portion of seat occupant weight on the right rear quadrant.

When the occupant sits on the seat, the first weight signal S1 is comprised of a first vertical force component Frf and a first error component $E1_{rf}$ induced by application of non-vertical seat forces to the seat bottom. Non-vertical forces, i.e., lateral Flt and longitudinal Flg forces, which are exerted against the seat bottom 18, can result from vehicle acceleration, deceleration, or turning, for example. These lateral Flt and longitudinal Flg forces induce error into the sensor measurement at each sensor location within the seat bottom 18.

The second weight signal S2 is comprised of a second vertical force component Flf and a second error component $E2lf$ induced by lateral Flt and longitudinal Flg forces. The third weight signal S3 is comprised of a third vertical force component Flr and a third error component $E3lr$ induced by lateral Flt and longitudinal Flg forces. The fourth weight signal S4 is comprised of a fourth vertical force component Frr and a fourth error component $E4rr$ induced by lateral Flt and longitudinal Flg forces. Thus, each sensor 26 generates a signal that includes some component of error.

The sensors 26 are preferably strain gages 40 comprised of longitudinally extending elements that are placed in tension or compression based on the direction of the applied force. The manufacture and operation of these strain gages is well known in the art. In order to provide a simplified and inexpensive weight sensing system, each pair of sensors 26 mounted within the seat bottom 18 are orientated such that one sensor 26a will generate a positive error (+) and the other sensor 26b will generate a negative error (−). Lateral Flt and/or longitudinal Flg forces acting the sensors 26 are a result of such forces acting on the seat 12. Due to the seat frame being of rigid construction, the forces will generally exert the same force on each sensor 26. The lateral Flt and longitudinal Flg forces that generate the error will apply the same magnitude of force to both sensors, however the direction or "sign" of the force is dependent upon the orientation of the sensor within the seat bottom 18. Thus, when the output from each pair of sensors 26 is combined, the errors will cancel each other out. If two (2) pairs of sensors are used then two (2) sensors must be orientated within the seat bottom to generate positive errors (+) while the other two (2) sensors must be orientated to generate negative errors (−).

For example, as shown in FIG. 2A, the first 26a and third 26c sensors are orientated within the first 28 and third 32 quadrants, respectively, such that the first $E1_{rf}$ and third $E3lr$ error components caused by the lateral Flt and longitudinal Flg forces are generated as positive errors (+). The second 26b and fourth 26d sensors are orientated within the second 30 and fourth 34 quadrants, respectively, such that the second $E2_{lf}$ and fourth $E4_{rr}$ error components caused by the lateral Flt and longitudinal Flg forces are generated as negative errors (−). As the example shows in FIG. 2A, the first 26a and third 26c sensors are in more forward positions than the second 26b and fourth 26d sensors, however other sensor configurations could be used.

Figure 2B:
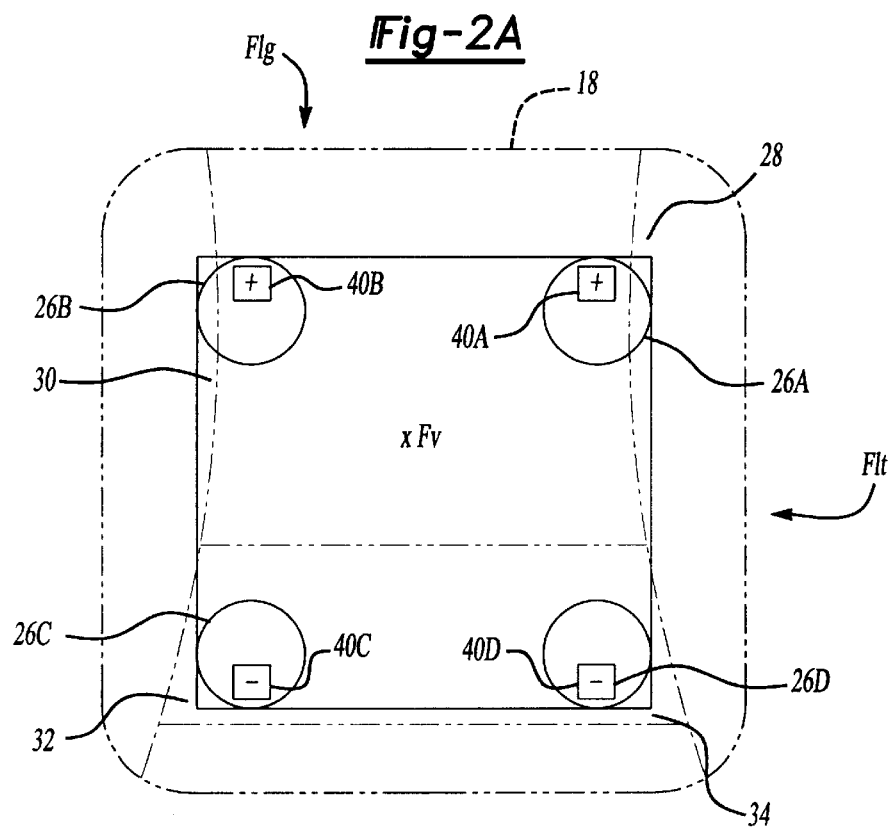
FIG. 2B is a view of an alternate embodiment of a seat bottom incorporating the subject weight measurement system.
Figure 2C:
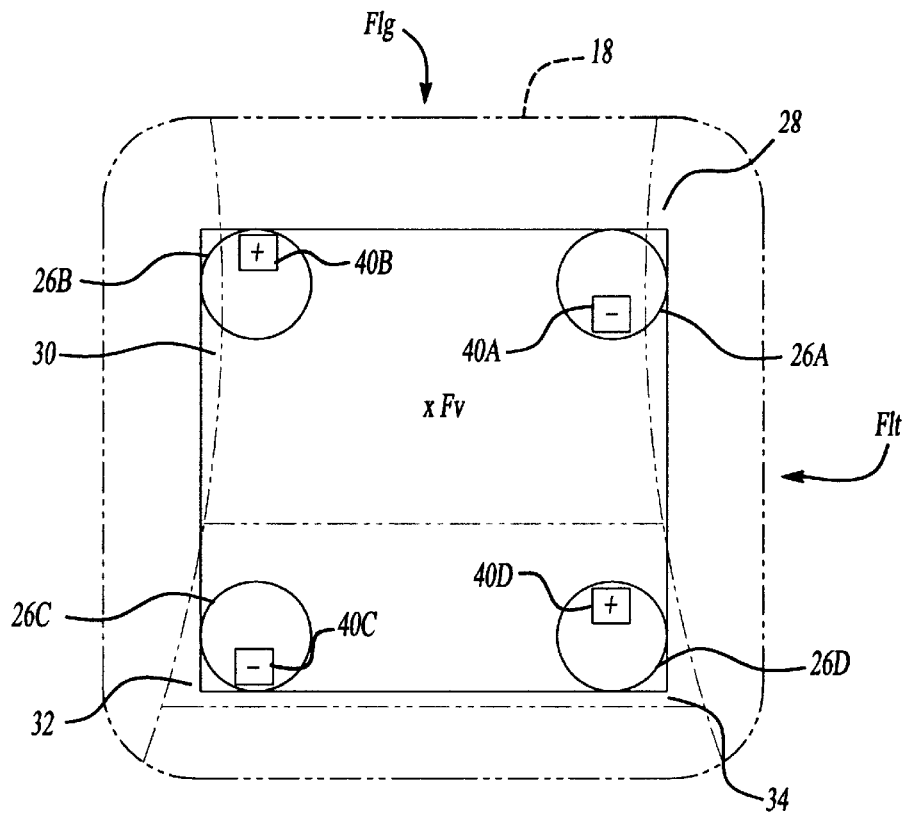
FIG. 2C is a view of an alternate embodiment of a seat bottom incorporating the subject weight measurement system.
Figure 2D:
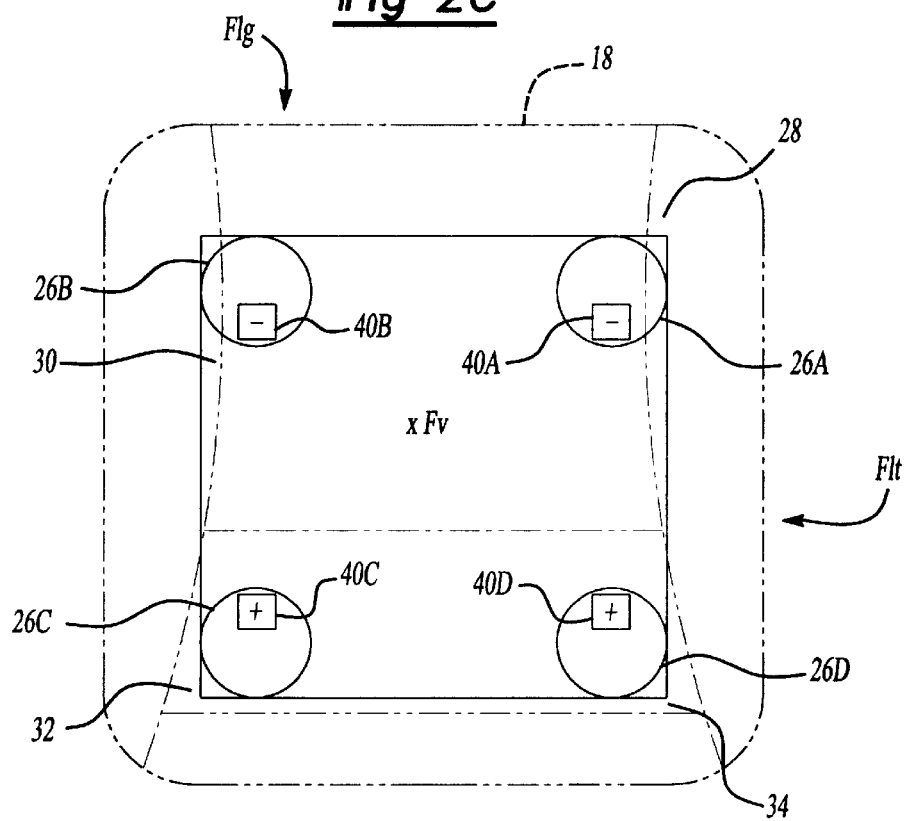
FIG. 2D is a view of an alternate embodiment of a seat bottom incorporating the subject weight measurement system.
Figure 2E:
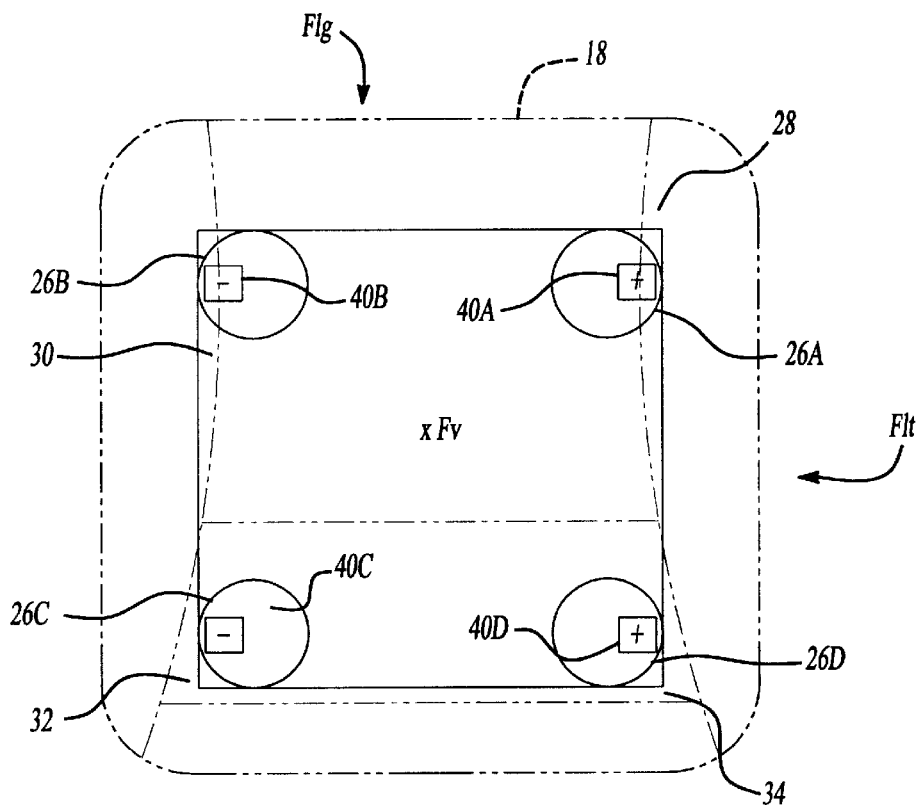
FIG. 2E is a view of an alternate embodiment of a seat bottom incorporating the subject weight measurement system.
Figure 2F:
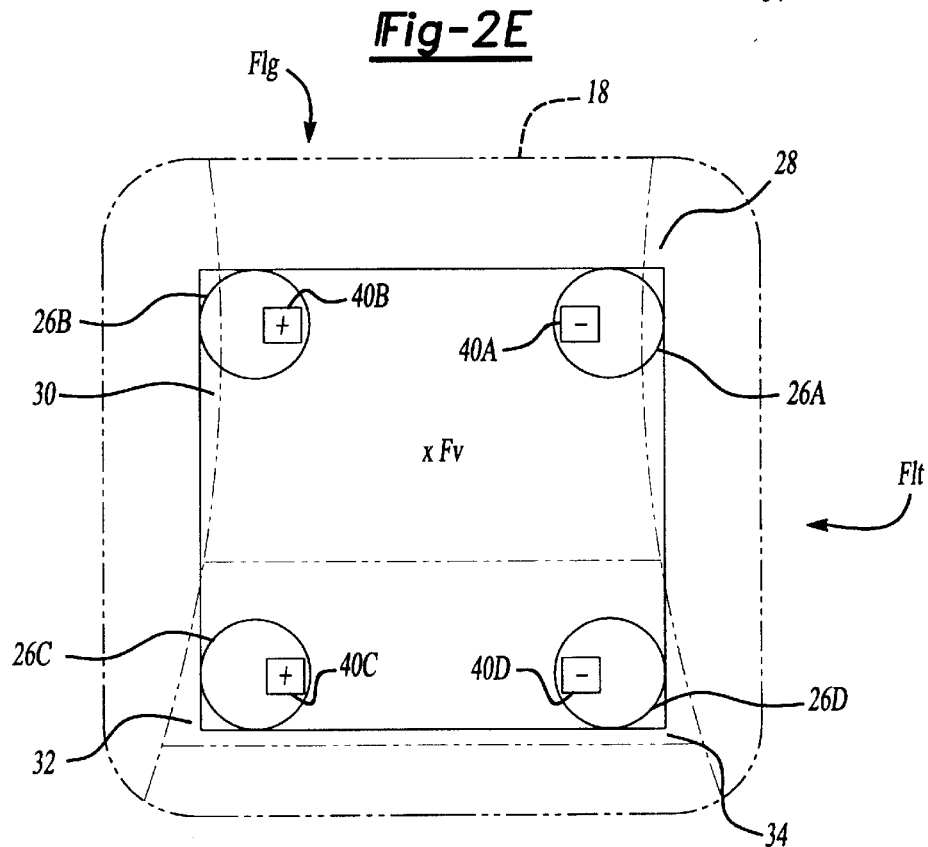
FIG. 2F is a view of an alternate embodiment of a seat bottom incorporating the subject weight measurement system.
Figure 2G:
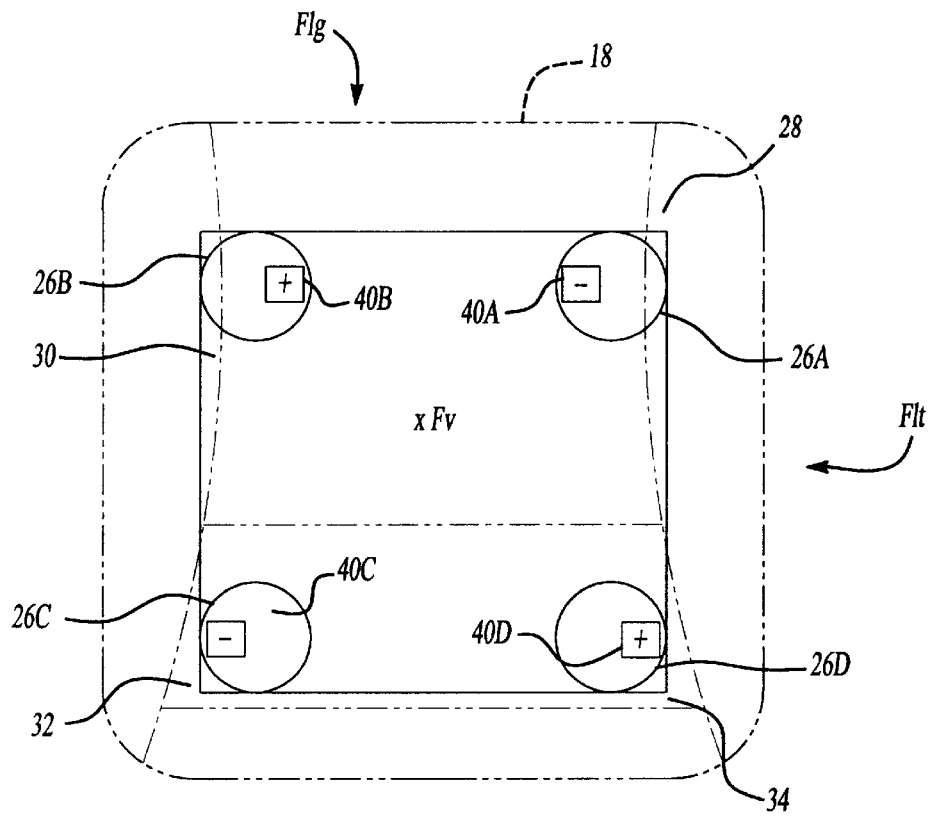
FIG. 2G is a view of an alternate embodiment of a seat bottom incorporating the subject weight measurement system.
Figure 2H:
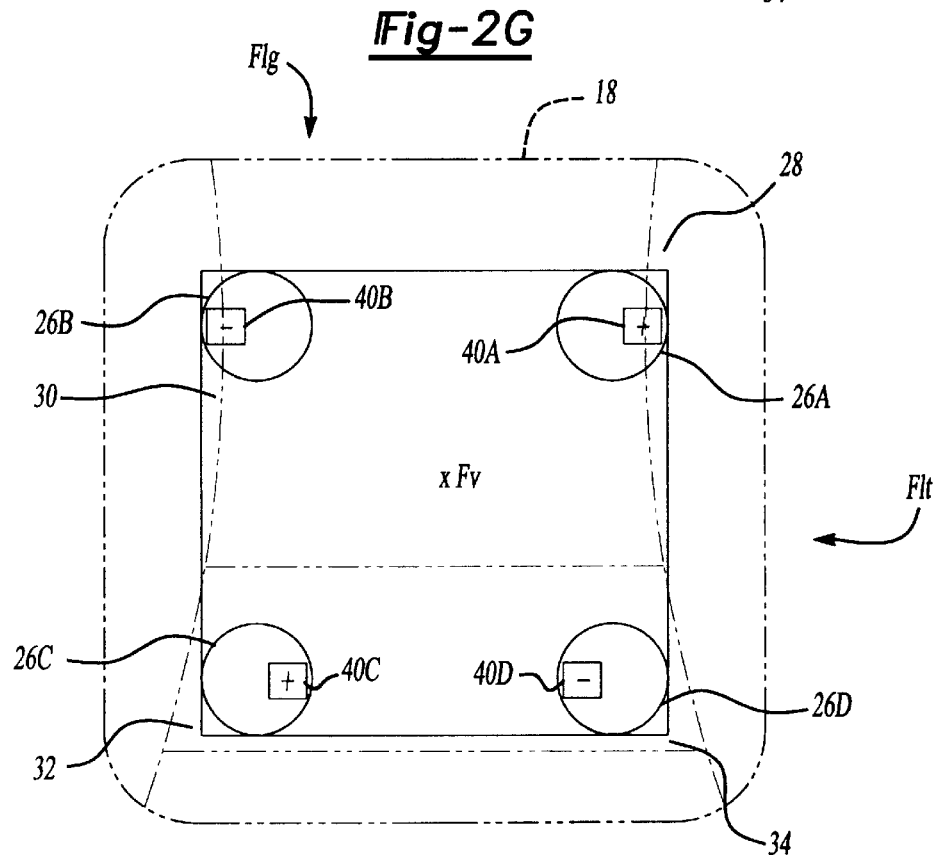
FIG. 2H is a view of an alternate embodiment of a seat bottom incorporating the subject weight measurement system.

While the configuration disclosed in FIG. 2A is preferred, it should be understood that other configurations, such as those shown in FIGS. 2B through 2H could also be used. FIGS. 2A–2D show gages 40 that are oriented forward or rearward within the sensor 26 to be positive (+) or negative (–). In FIG. 2A, the first 40a and third 40c gages are orientated forwardly to generate positive (+) errors and the second 40b and fourth 40d gages are orientated rearwardly to negative (–) errors. In FIG. 2B, the first 40a and second 40b gages are orientated forwardly to generate positive (+) errors and the third 40c and fourth 40d gages are orientated rearwardly 46 to generate negative (–) errors. In FIG. 2C, the second 40b and fourth 40d gages are orientated forwardly to generate positive (+) errors and the first 40a and third 40c gages are orientated rearwardly to generate negative (–) errors. In FIG. 2D, the first 40a and second 40b gages are orientated rearwardly to generate negative (–) errors and the third 40c and fourth 40d gages are orientated forwardly to generate positive (+) errors. FIGS. 2E–2H show gages 40 that are orientated left to right within the sensor 26 to be positive (+) or negative (–). In FIG. 2E, the first 40a and fourth 40d gages are orientated to the right to generate positive (+) errors and the second 40b and third 40c gages are orientated to the left to generate negative (–) errors. In FIG. 2F, the second 40b and third 40c gages are orientated to the right to generate positive errors (+) and the first 40a and fourth 40d gages are orientated to the left to generate negative (–) errors. In FIG. 2G, the second 40b and fourth 40d gages are orientated to the right to generate positive errors (+) and the first 40a and third 40d gages are orientated to the left to generate negative errors (–). In FIG. 2H, the first 40a and third 40c gages are orientated to the right to generate positive (+) errors and the second 40b and fourth 40d gages are orientated to the left to generate negative (–) errors.

Figure 3:
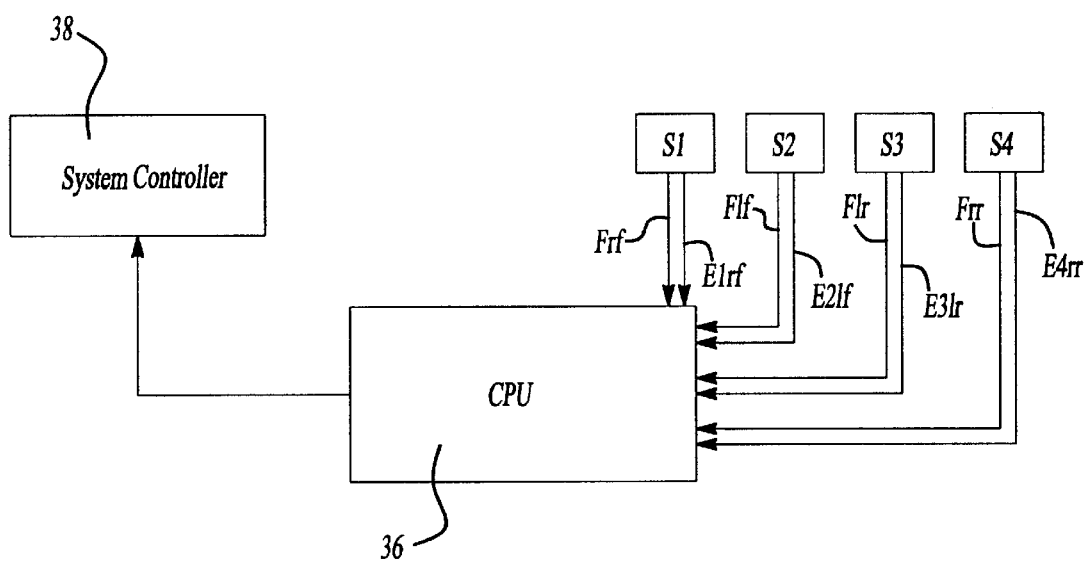
FIG. 3 is a schematic view of a control system for the subject weight measurement system.

In the occupant weight sensing application, the individual force measurement from a single sensor 26 is not used. It is a combination of the plurality of sensors 26a, b, c, d that is used to determine the occupant's weight and weight distribution in the seat 12. A central processing unit (CPU) 36, shown in FIG. 3, determines seat occupant weight based on the summation of the first, second, third, and fourth weight signals S1, S2, S3, S4. Adding the positive and negative error components together eliminates the error induced by the lateral Flt and longitudinal Flg forces.

The total weight is equal to S1+S2+S3+S4=(Frf+E1rf)+(Flf–E2lf)+(Flr+E3lr)+(Frr–E4rr)=Frf+Flf+Flr+Frr. In addition to determining the total weight of the seat occupant, it is sometimes necessary to determine the front to rear and/or left to right weight distribution. The front to rear weight distribution can also be determined by adding the third S3 and fourth S4 weight signals or the first S1 and second S2 weight signals and dividing by the total weight: [(Frf+E1rf)+(Flf–E2lf)]/(Frf+Flf+Flr+Frr)=(Frf+Flf)/(Frf+Flf+Flr+Frr). The left to right distribution is determined by adding the first S1 and S4 or second S2 and third S3 weight signals together and dividing by the total weight: [(Frf+E1rf)+(Frr–E4rr)]/(Frf+Flf+Flr+Frr)=(Frf+Frr)/(Frf+Flf+Flr+Frr).

Once the CPU 36 has determined the seat occupant weight, the information is used to control the airbag system 14. An airbag control module 38 is in communication with the CPU 36 such that when the predetermined collision characteristics are achieved, the deployment force of the airbag 24 is controlled by the air bag control module 38 based on seat occupant weight. It should be understood that the airbag control module 38 and the CPU 36 can be separate processing units or the airbag control module 38 can be incorporated into the CPU 36.

The method for determining the weight of the seat occupant begins with providing a vertical occupant force Fv against the seat bottom 18. A first weight signal S1 is generated that has a first vertical force component Frf and a first error component $E1_{rf}$ induced by application of a non-vertical force to the seat bottom 18. A second weight signal S2 is generated that has a second vertical force component Flf and a second error component $E2_{lf}$ induced by application of the non-vertical force to the seat bottom 18. A third weight signal S3 is generated that has a third vertical force component Flr and a third error component $E3_{lr}$ induced by application of the non-vertical force to the seat bottom 18. A fourth weight signal S4 is generated that has a fourth vertical force component Frr and a fourth error component $E4_{rr}$ induced by application of the non-vertical force to the seat bottom 18. The first $E1_{rf}$ and third $E3_{lr}$ error components are preferably generated as positive error (+) while the second $E2_{lf}$ and fourth $E4_{rr}$ error components are preferably generated as negative error. The first S1, second S2, third S3, and fourth S4 weight signals are combined and the error induced by the non-vertical forces is cancelled by adding the positive and negative error components together. The first Frf, second Flf, third Flr, and fourth Frr vertical force components are combined to determine seat occupant weight.

The first weight signal S1 is generated to correspond to a portion of seat occupant weight on the first quadrant 28, the second weight signal S2 is generated to correspond to a portion of seat occupant weight on the second quadrant 30, the third weight signal S3 is generated to correspond to a portion of seat occupant weight on the third quadrant 32, and the fourth weight signal S4 is generated to correspond to a portion of seat occupant weight on the fourth quadrant 34.

As discussed above, a first strain gage 40a has a first orientation within the first sensor 26a to produce a positive error in response to application of the lateral and longitudinal forces to the seat bottom 18 and a second strain gage 40b has a second orientation, opposite from the first orientation, within the second sensor 26b to produce a negative error in response to application of the non-vertical force to the seat bottom 18. The third 26c and fourth 26d sensors include strain gages 40c, 40d having similar orientation.

Additional steps include providing a system controller 38 for controlling deployment of an airbag 24 wherein a seat occupant weight signal is generated based on the addition of the first, second, third, and fourth vertical force components. The signal is to the controller 38, which controls the deployment force of the airbag 24 based on the seat occupant weight.

The subject seat occupant weight sensing system uses the output from a plurality of simplified sensor elements to measure the weight of a seat occupant and further provides an accurate weight measurement by eliminating error caused by lateral and longitudinal forces. Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A method for determining the weight of a seat occupant comprising the steps of:

(a) providing a vertical occupant force against a seat bottom;

(b) generating a first weight signal having a first vertical force component and a positive error component induced by application of a non-vertical force to the seat bottom;

(c) generating a second weight signal having a second vertical force component and a negative error component induced by the non-vertical force;
(d) combining the first and second weight signals;
(e) canceling error induced by the non-vertical force by adding the positive and negative error components; and
(f) adding the first and second vertical force components to determine seat occupant weight.

2. The method according to claim 1 wherein the seat bottom includes at least a first seat portion and a second seat portion with step (b) further defined as generating the first weight signal to correspond to a portion of seat occupant weight on the first seat portion and with step (c) further defined as generating the second weight signal to correspond to a portion of seat occupant weight on the second seat portion.

3. The method according to claim 2 wherein step (b) further includes providing a first sensor mounted within the first seat portion for generating the first weight signal and step (c) further includes providing a second sensor mounted within the second seat portion for generating the second weight signal.

4. The method according to claim 3 wherein step (b) further includes providing the first sensor with a first strain gage having a first orientation within the first sensor to produce a positive error in response to application of the non-vertical force to the seat bottom and step (c) further includes providing the second sensor with a second strain gage having a second orientation, opposite from the first orientation, within the second sensor to produce a negative error in response to application of the non-vertical force to the seat bottom.

5. The method according to claim 1 including the steps of generating a third weight signal having a third vertical force component and a positive error component induced by the non-vertical force and generating a fourth weight signal having a fourth vertical force component and a negative error component induced by the non-vertical force prior to step (d) and wherein step (d) further includes combining the first, second , third, and fourth weight signals and wherein step (f) further includes adding the first, second, third, and fourth vertical force components to determine seat occupant weight.

6. The method according to claim 5 wherein the seat bottom includes at least a first quadrant, a second quadrant, a third quadrant, and a fourth quadrant and including the steps of generating the first weight signal to correspond to a portion of seat occupant weight on the first quadrant in step (b), generating the second weight signal to correspond to a portion of seat occupant weight on the second quadrant in step (c), generating the third weight signal to correspond to a portion of seat occupant weight on the third quadrant, and generating the fourth weight signal to correspond to a portion of seat occupant weight on the fourth quadrant.

7. The method according to claim 6 including the steps of providing a first sensor mounted within the first quadrant for generating the first weight signal during step (b), providing a second sensor mounted within the second quadrant for generating the second weight signal during step (c), providing a third sensor mounted within the third quadrant for generating the third weight signal, and providing a fourth sensor mounted within the fourth quadrant for generating the fourth weight signal.

8. The method according to claim 7 including the steps of providing the first sensor with a first strain gage having a first orientation within the first sensor to produce a positive error in response to application of the non-vertical force to the seat bottom, providing the second sensor with a second strain gage having a second orientation, opposite from the first orientation, within the second sensor to produce a negative error in response to application of the non-vertical force to the seat bottom, providing the third sensor with a third strain gage having the first orientation within the third sensor to produce a positive error in response to application of the non-vertical force to the seat bottom, and providing the fourth sensor with a fourth strain gage having the second orientation within the fourth sensor to produce a negative error in response to application of the non-vertical force to the seat bottom.

9. The method according to claim 8 wherein the first quadrant is defined as a right front quadrant, the second quadrant is defined as a left front quadrant, the third quadrant is defined as a left rear quadrant, and the fourth quadrant is defined as a right rear quadrant and further including the steps of combining the first and second weight signals, canceling error induced by the non-vertical force by adding the positive and negative error components, adding the first and second vertical force components to determine seat occupant weight on a front portion of the seat bottom and dividing the sum of the first and second vertical force components by the sum of the first, second, third, and fourth vertical force components to determine seat occupant weight distribution for front to rear.

10. The method according to claim 8 wherein the first quadrant is defined as a right front quadrant, the second quadrant is defined as a left front quadrant, the third quadrant is defined as a left rear quadrant, and the fourth quadrant is defined as a right rear quadrant and further including the steps of combining the first and fourth weight signals, canceling error induced by the non-vertical force by adding the positive and negative error components, adding the first and fourth vertical force components to determine seat occupant weight on a right side portion of the seat bottom and dividing the sum of the first and fourth vertical force components by the sum of the first, second, third, and fourth vertical force components to determine seat occupant weight distribution for right to left.

11. A method according to claim 1 including the steps of providing a system controller for controlling deployment of an airbag; generating a seat occupant weight signal based on the addition of the first and second vertical force components; transmitting the seat occupant weight signal to the controller; and controlling a deployment force of the airbag based on the seat occupant weight.

12. The method according to claim 1 including the step of generating the first and second signals from independent sensor locations within the seat bottom.

13. A system for measuring the weight of a seat occupant comprising:
a seat bottom for receiving a substantially vertical seat occupant weight force;
at least one pair of sensors including a first sensor mounted within a first portion of said seat bottom for generating a first weight signal comprised of a first vertical force component and a positive error component induced by application of non-vertical seat forces to said seat bottom and a second sensor mounted within a second portion of said seat bottom for generating a second weight signal comprised of a second vertical force component and a negative error component induced by application said non-vertical seat forces; and
a processor for determining seat occupant weight based on said first and second weight signals wherein seat occupant weight is determined by summation of said first and second vertical force components and error induced by said non-vertical seat forces is eliminated by adding said positive and negative error components.

14. A system according to claim 13 wherein said first sensor includes a first strain gage having a first orientation for generating a positive error in response to application of said non-vertical force to said seat bottom and said second sensor includes a second strain gage having a second orientation, opposite from said first orientation, for generating a negative error in response to application of said non-vertical force to said seat bottom.

15. A system according to claim 13 wherein said at least one pair of sensors is comprised of a first and second pair of sensors, said first pair of sensors including said first and second sensors and said second pair including a third sensor mounted within a third portion of said seat bottom for generating a third weight signal comprised of a third vertical force component and a positive error component induced by said non-vertical seat forces and a fourth sensor mounted within a fourth portion of said seat bottom for generating a fourth weight signal comprised of a fourth vertical force component and a negative error component induced by application said non-vertical seat forces.

16. A system according to claim 15 wherein said first portion is defined as a right front quadrant, said second portion is defined as a left front quadrant, said third portion is defined as a left rear quadrant, and said fourth portion is defined as a right rear quadrant; said first weight signal corresponding in magnitude to a portion of seat occupant weight on said right front quadrant, said second weight signal corresponding in magnitude to a portion of seat occupant weight on said left front quadrant, said third weight signal corresponding in magnitude to a portion of seat occupant weight on said left rear quadrant, and said fourth weight signal corresponding in magnitude to a portion of seat occupant weight on said right rear quadrant.

17. A system according to claim 13 including an airbag control module in communication with said processor wherein deployment force of an airbag is controlled by said control module based on seat occupant weight.

18. A system for measuring the weight of a seat occupant comprising:

a seat bottom for receiving a substantially vertical seat occupant weight force and being divided into a first quadrant, a second quadrant, a third quadrant, and a fourth quadrant;

a first sensor mounted within said first quadrant for generating a first weight signal comprised of a first vertical force component and a first error component induced by application of non-vertical seat forces to said seat bottom;

a second sensor mounted within said second quadrant for generating a second weight signal comprised of a second vertical force component and a second error component induced by application said non-vertical seat forces;

a third sensor mounted within said third quadrant for generating a third weight signal comprised of a third vertical force component and a third error component induced by application said non-vertical seat forces;

a fourth sensor mounted within said fourth quadrant for generating a fourth weight signal comprised of a fourth vertical force component and a fourth error component induced by application said non-vertical seat forces;

said first and third sensors being orientated within said first and third quadrants, respectively, such that said first and third error components caused by said non-vertical seat forces are generated as positive errors and said second and fourth sensors being orientated within said second and fourth quadrants, respectively, such that said second and fourth error components caused by said non-vertical seat forces are generated as negative errors; and a processor for determining seat occupant weight based on said first, second, third, and fourth weight signals wherein error induced by said non-vertical seat forces is eliminated by adding said positive and negative errors.

19. An assembly according to claim 18 wherein said processor determines seat occupant weight is determined by summation of said first, second, third, and fourth vertical force components.

20. An assembly according to claim 19 wherein said processor includes an airbag control module wherein deployment force of an airbag is controlled by said control module based on seat occupant weight.

* * * * *